United States Patent [19]

Murton

[11] 3,881,917

[45] May 6, 1975

[54] METHOD OF REFINING STEEL

[76] Inventor: Crawford B. Murton, 1906 Brushcliff Rd., Pittsburgh, Pa. 15221

[22] Filed: Jan. 21, 1974

[21] Appl. No.: 435,093

[52] U.S. Cl. .............................. 75/52; 75/53; 75/94
[51] Int. Cl. ........................... C21c 7/00; C22b 9/10
[58] Field of Search ..................... 75/52, 53, 58, 94

[56] References Cited
UNITED STATES PATENTS

| 2,781,256 | 2/1957 | Richards | 75/53 |
| 3,799,762 | 3/1974 | Cass | 75/94 |
| 3,802,865 | 4/1974 | Ohkubo | 75/53 |

Primary Examiner—P. D. Rosenberg

[57] ABSTRACT

A method for refining an iron-base metal such as pig iron which contains minor amounts of elements including silicon, manganese, phosphorus, carbon, sulfur, and other incidental impurities, characterized by the steps of containing molten iron-base metal in a metallurgical vessel, heating and oxidizing the molten metal to cause chemical reactions to remove excessive contents of the said elements, adding solid lime and a mixture of fluorspar and slag conditioners of relatively high basicity (lime-to-silica ratios of 2.5 to 4.0) which conditioners consist essentially of oxides of selected metals including iron, manganese, silicon, magnesium, and calcium, and which conditioners have a melting point of from about 2,000 to 2,800 F, and continuing to heat while oxidizing the mixture of the molten metal, slag conditioner, fluorspar and slag-forming materials until said minor amounts of elements are reduced to the desired percentages, and are retained in the slag formed. More specifically, the function of the slag-conditioner is to eliminate the encapsulation of large particles of lime by dicalcium silicate and thereby more rapidly taking the lime into solution. The function of the mixture of fluorspar and slag conditioner is to promote more rapid solution of the solid lime than is obtainable with the use of either fluorspar or slag conditioner alone.

9 Claims, 1 Drawing Figure

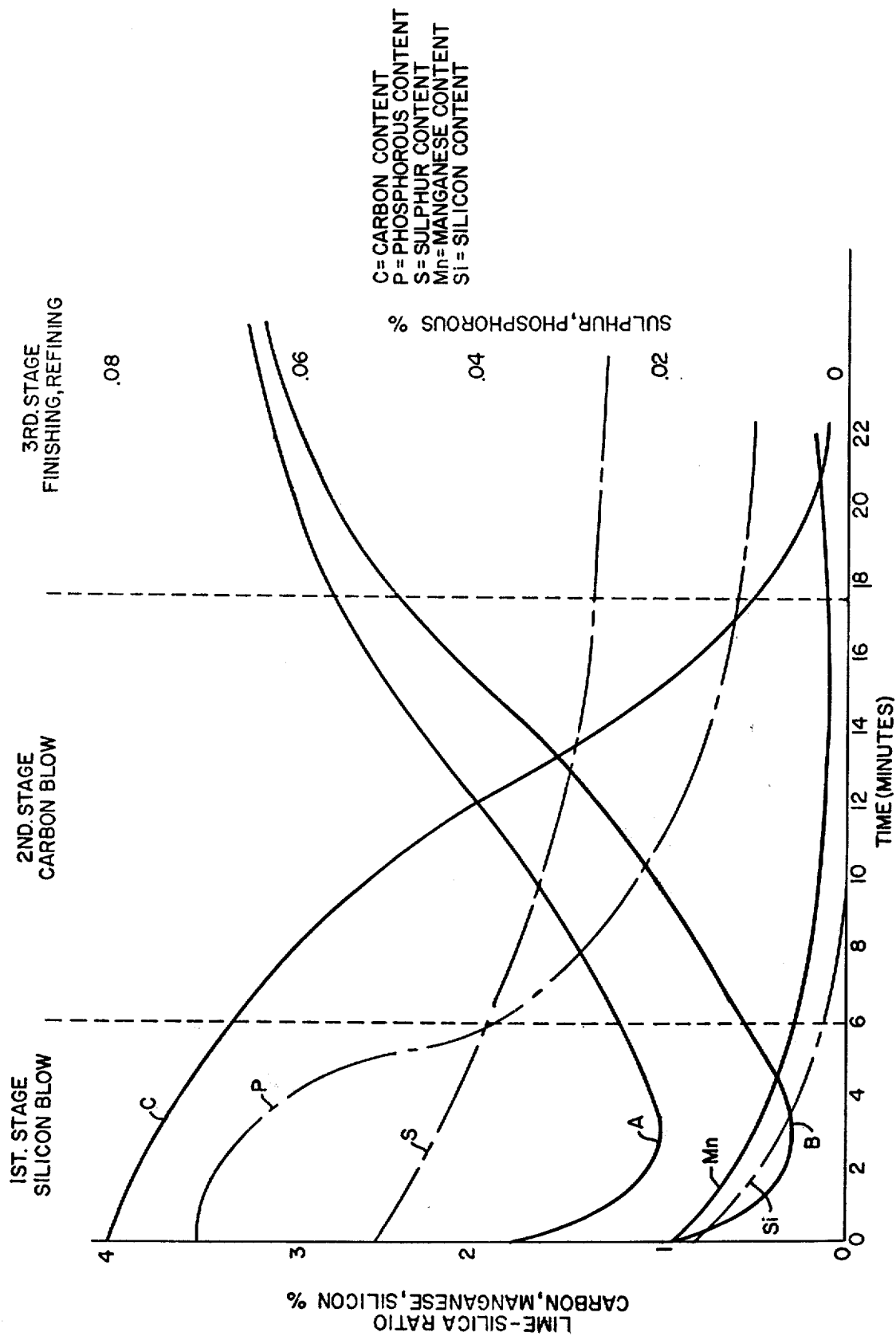

METHOD OF REFINING STEEL

CROSS-REFERENCE TO THE RELATED APPLICATION

This invention is related to the application of C. B. Murton, Ser. No. 368,118 filed June 8, 1973.

BACKGROUND OF THE INVENTION

1. Field of the Invention

This invention relates to a method of refining steel.

2. Description of the Prior Art

The current practice in refining steel, either in an open hearth furnace or a basic oxygen converter, consists of additions of burnt lime, dolomitic lime, and fluorspar to form a basic slag that reacts with the oxidation products of silicon, carbon, manganese, phosphorus, sulfur, and incidental impurities from the charged materials which normally consist of steel scrap and hot metal from the blast furnace. Normally, the cold scrap is charged into the furnace or converter, the hot metal is then added, and the refining procedure commences. Burnt lime, dolomitic lime, and spar additions are made to the bath in order to provide the desired slag composition. The silicon in the hot metal is first oxidized and molten silica is formed and mixes with the mixture of burnt lime, dolomitic lime and fluorspar.

Inasmuch as burnt lime and dolomitic lime have melting points in excess of 4,500°F, the particles or chunks of those slag-forming limes are substantially immersed in the molten silica which forms a layer of dicalcium silicate that completely envelopes the exterior of each basic particle of burnt lime and dolomitic lime. The resulting material is highly refractory and has an even lower rate of solubility than the original burnt lime and therefore inhibits the solution of lime and extends the time required to accomplish lime solution. This is perhaps the most significant barrier to the early creation of a desirable slag composition in the overall refining process.

When the slag conditioner and fluorspar are added to the conventional charge, the ratio of lime-to-silica is approximately one-ton-one. During the first stage of oxidation (silicon blow) silicon oxidizes to silica and lowers the ratio of lime to silica below the one-to-one proportion. As the amount of silicon available for oxidation diminishes and the amount of silica forming diminishes, and a minimum ratio, for example, of from 0.4 to 1, is reached, the basicity of the slag subsequently formed slowly increases as the solid basic particles of burnt lime and dolomitic lime begin to go into solution. Fluorspar has been used to speed up lime solution rate, but it does not prevent refractory encapsulation of the lime particles. It reacts to disrupt these envelopes and therefore its impact is confined to the latter stages of the process. Fluorspar particles have a high melting point and are also subject to encapsulation by the high silica liquid formed in the early stages of refining. Encapsulation impedes the rate of solution of lime particles and in like manner impedes the rate of solution of fluorspar. Therefore, steel producers are actively seeking a better material that will equal or exceed fluorspar's acceleration of lime solution rate and that will not have its harmful side effects. Further, fluorspar supply is limited and the price has increased continuously over the past 20 years. Currently from about 3 to 25 pounds of fluorspar are used per ton of steel produced depending on local steel works raw material parameters. There exits therefore a need for the introduction of a slag conditioner as a partial but substantial substitute for fluorspar.

SUMMARY OF THE INVENTION

It has been found in accordance with this invention that the foregoing problems may be overcome by a method for refining pig iron in a metallurgical vessel by adding solid lime, and a mixture of fluorspar and slag-conditioners consisting essentially of oxides of the metals including iron, manganese, calcium, magnesium, and silicon. The slag-conditioners consist essentially of, by weight percent, from about 5–50 percent iron oxide, from about 2–20 percent manganese oxide, from about 2–15 percent magnesium oxide, from about 20 to 50 percent calcium oxide, and from about 8–25 percent silicon oxide. The slag conditioners range in melting point from 2000° to 2800°F. The function of these slag-conditioners is to expedite taking the solid lime additions into solution. The process of this invention avoids the prior art process of encapsulation that occurs when the particles of solid lime and fluorspar are surrounded by molten silica formed in the oxidation reactions. The slag-conditioners melt at low temperature 2,000° to 2,800°F to form a liquid of high basicity in which the solid lime particles are immersed. This precludes formation of the refractory envelope of dicalcium silicate and permits the rapid liquifaction of the lime and fluorspar particles consistent with phase-diagram relationships. Thus, at any given stage of the process higher lime-silica ratios are present since more of the solid lime and fluorspar particles are taken into solution per unit of time.

The advantages of the method of this invention is that combinations of the class of slag conditioners with fluorspar give results at least equivalent to or improved over that of the sole use of said conditioners or only fluorspar and that in certain grades of steel the refining of steel proceeds far more rapidly than when only fluorspar or only said conditioners are used. The most important advantage is that environmental contamination from toxic fluorine gas can be reduced in excess of 75 percent without loss of efficiency in steel refining when compared to the use of fluorspar solely.

DESCRIPTION OF THE DRAWINGS

For a better understanding of this invention, reference is made to the single FIGURE of the drawing which is a graph showing changes in the lime-silica ratio, carbon, manganese, silicon, sulfur and phosphorus with time.

DESCRIPTION OF THE PREFERRED EMBODIMENT

The process of the present invention comprises the steps of:

1. containing molten iron-base metal in a metallurgical vessel, 2. heating and oxidizing the molten iron-base metal to reduce the minor amounts of such elements as silicon, manganese, phosphorus, sulfur and carbon, 3. adding a predetermined mixture of fluorspar and slag-conditioner, and burnt lime with or without dolomitic lime the slag conditioner consisting essentially of oxides of the metals including iron, manganese, magnesium, calcium and silicon and having a melting point of from about 2,000° to 2,800 F, and 4. continuing to heat and oxidize the molten metal until the desired compositions of said elements are obtained.

The process of this invention may be carried out in any one of a number of types of refining furnaces, such as the open hearth furnace, basic oxygen converter, submerged oxygen converter, and electric furnace. Some differences in procedure may exist but are inconsequential to the overall results and particularly the type of slag used. For the purposes of description of this invention, the basic oxygen process is described with exceptions for the other processes noted where pertinent.

After the converter is charged with controlled amounts of steel scrap and molten iron, it is rotated to an upright position and an oxygen lance is inserted through the open top to a predetermined position above the surface of the bath. Molten metal is pig iron which consists primarily of the element iron combined with numerous other chemical elements including carbon, manganese, phosphorus, sulfur and silicon, those elements may consist of from about 3.0 to 4.5 percent carbon, from 0.15 to 2.5 percent manganese, as much as 0.2 percent sulfur, from 0.025 to 2.5 percent phosphorus, and from 0.5 to 4.0 percent silicon, depending upon such factors as the composition of the raw materials and the manner in which the blast furnace is operated.

These elements must be removed almost entirely or reduced in amount during the refining or converting of the molten metal into steel. For that purpose, in the basic oxygen furnace, substantially pure oxygen gas is directed from a lance or jet nozzle at a high velocity and under a pressure of between 140 to 180 pounds per square inch. The resulting phenomenon is partly physical and partly chemical. As the oxygen strikes the liquid metal bath, oxidation of silicon to form silica commences, and conforms to the violent flow path created by the dynamic input of the oxygen stream.

Within about 2 minutes, preferably 1 minute, it is necessary to add the mixture of slag-conditioner and fluorspar, and slag-forming materials, such as burnt lime or dolomitic lime in order to cope with the amounts of silica formed as well as other oxides such as iron oxide. For other steel making processes such as the open hearth furnace and electric furnace, the time period is longer, i.e., up to 1 hour or more. The mixture of fluorspar and slag-conditioner may be added before, during, or after the additions of burnt lime and/or dolomitic lime.

The characteristics of a desirable slag-conditioner are high fluidity, low melting point, high reactivity in the initial stages of the melting operation, high basicity, non-contamination, and low-cost. Slag-conditioners of this invention consist essentially of the materials and amounts listed in the following Table I:

TABLE I

| Compound | Percent by Weight Useful Amounts | Preferred Amounts | Optimum Amounts |
| --- | --- | --- | --- |
| Iron Oxide | 5–50 | 15–30 | 25 |
| Manganese Oxide | 2–20 | 5–15 | 10 |
| Magnesium Oxide | 0–15 | 8–10 | 9 |
| Calcium Oxide | 20–50 | 30–48 | 42 |
| Silicon Oxide | 8–25 | 10–16 | 14 |

Although the particle size of the materials added may vary widely from fine to coarse without seriously reducing their chemical effectiveness, the preferred size range is from about ¾ to 1¼ inch average diameter. Manifestly, the particle size should not be so fine as to be blown from the converter.

The materials comprising the slag-conditioners of this invention are primarily obtained by the recovery of slags from prior refining processes, such as from the open hearth furnace, the electric furnace, and the basic open hearth converter, or by synthesis of these materials. These materials are crushed to remove gross metallics, screened to the proper size, and blended with oxides of iron, manganese, magnesium, silicon and calcium as required. The oxides of the several metals indicated may be obtained from such sources as flue dust and from steel making processes which are essentially iron oxide, ferromanganese dust from the blast furnaces which are rich in iron and manganese oxide as well as metallic manganese, lime dust from cement plants, and the like which are oxides of calcium and magnesium. These materials are synthesized into desired particle sizes and blended to desired compositions.

Synthesis of the recovered slags may be accomplished in various ways, such as mixing a moistened amount of dust, for example, flue dust with finely powdered quartzite or disposable glass particles and sodium silicate, or other hydraulic binders, and allowing the mixture to set with the aid of heat or dry air. Another technique for synthesizing involves the use of these materials with sodium silicate, and carbon dioxide gas injection which causes solidification into larger shapes of the combined ingredients and crushed for charging into the converter.

Molten slags from basic open hearth and basic oxygen processes may be treated with borax, sodium silicate, oxides of alkaline metals or silica to depress the melting point. The slag is then blended with oxides of iron, manganese, magnesium, and calcium, as required, to provide the compositions indicated in Table I.

Another method for preparing these slag-conditioners involves pouring of molten slag onto a blended mixture of oxides of iron, manganese, magnesium, silica and calcium to form a heterogeneous mass which is cooled, crushed, and sized for addition to the basic oxygen converter.

Molten slags recovered from the various processes may be blended with or without oxides of iron, manganese, magnesium, silicon, and calcium to form slag-conditioners to be added to basic oxygen converters, or some slag from a previous heat may be retained in the converter or furnace for use with the next heat.

These slags may also be treated with synthetic oxides of the above-mentioned metals to produce slag-conditioners for use in the liquid state in the basic oxygen converter. Finally, molten slag of high basicity may be treated with the oxides of the above-mentioned metals, blended with the hot metal, and poured into the converter.

The useful quantity of slag-conditioner is from about 3 to 50 pounds per ton of steel and the useful quantities of slag formers (burnt lime or burnt lime and dolomitic lime) are additions of from about 110 to 200 pounds per ingot ton. The preferred range of slag-conditioner is from about 12 to 22 pounds per ton of steel and the optimum for best results is about 17.5 pounds of slag conditioner portion of steel. Generally, the addition occurs one minute after the oxygen blowing has commenced.

The melting point of the slag-conditioner is preferably less than that of the hot-metal charge and in the range of 2,000° to 2,800°F as compared with burnt lime and dolomitic lime melting points in excess of 4,500°F.

Fluorspar, or spar ($CaF_2$) mixed with said slag conditioners and is added to obtain an overall more rapid solution of solid lime since the slag-conditioners described herein also prevent the encapsulation of the fluorspar particles by molten silica which impedes the solution rate of fluorspar. Thus the slag conditioners make fluorspar more effective at lower temperatures and shorter time in the time cycle for refining the steel. The proportion of the fluorspar and slag conditioners makes it possible to reduce the amount of fluorspar added to minimize the disadvantages inherent in fluorspar, i.e., toxicity, adverse effect on converter lining life, high decomposition temperature and limited availability. In fact, where the disadvantages of fluorspar are not prohibitive, a mixture composed of fluorspar and the slag conditioners promotes a more rapid solution rate of solid lime than either fluorspar alone or said conditioners. Since the slag conditioners at least equal fluorspar in overall results, it is then possible to use reduced quantities of both.

Fluorspar is added with slag conditioner in accordance with this invention. Mixtures of fluorspar and slag conditioner are added in amounts listed in the following Table II:

TABLE II

| Compound | Useful Range | Percent by Weight Preferred Range | Commercial A Range | Commercial B Range |
|---|---|---|---|---|
| Fluorspar | 0.1–99.9 | 5–95 | 10–90 | 20–80 |
| Metal Oxide | 0.1–99.9 | 5–95 | 10–90 | 20–80 |

The useful range of compound mixtures in Table II embraces most of the steel refining processes and ranges of available raw materials and finished steel products. The preferred range includes 90 percent of possible parameters used in steel refining. Commercial A range and commercial B range include, respectively, 80 percent and 40 percent of the possible steel refining parameters.

For high carbon steel production especially, the use of fluorspar and the slag conditioner enables lime particles to be taken into liquid solution much earlier than in the case where either fluorspar or slag conditioner is used alone. Thus, the optimum combination for high carbon steel is 50 percent fluorspar and 50 percent of slag conditioner For example, where 5 lbs. of fluorspar would normally be used, the combination would consist of 2.5 lbs of fluorspar and 5.0 lbs. of the slag conditioner. The slag conditioner has been found to require 1.3 to 2 times the normal fluorspar charge by weight to yield results equivalent to the use of fluorspar alone.

When the slag-conditioner and fluorspar are added with burnt lime with or without dolomitic lime, the slag conditioner melts rapidly to form a basic pool that surrounds the burnt lime, dolomitic lime, and fluorspar particles and thereby prevents the formation of the dicalcium silicate envelope or layer around each basic particle which occurs in the conventional process. The rate of solution of burnt lime and dolomitic lime is greatly increased. Further, the high iron oxide content of the slag conditioner accelerates phosphorus oxidation and helps to hold it in solution during the slag formation. It is significant that in the early stages of the heat optimum conditions for the removal of phosphorus are provided and in the subsequent stage (carbon blow) higher basicity at lower iron oxide levels is achieved than is possible with the conventional practice where only fluorspar was added.

Referring to drawing, curve A is representative of the basicity ratios achieved by adding the slag conditioners along with the lime additions.

By adding fluorspar and slag conditioners of this invention early in the process, perhaps one or two minutes after commencement of the blowing, the lime-silica ratio is of the order of 1.8 to 2. Although the ratio decreases as oxidation of silicon in the metal proceeds during the silicon blow, it does not decrease to as low a minimum, under 0.5, as under current practice. Thus, the lime-silica ratio is maintained above the 1:1 level and, more importantly, the remaining solid particles of the lime are more rapidly taken into solution. Thus, after most of the silicon has been oxidized, the second stage of the heat (carbon blow) commences and the slag formed has a higher lime-silica ratio than is true for current practice.

A comparison of curves A and B (conventional practice) indicates that during the initial stage of the heat "the silicon blow" the low melting point slag conditioner creates a highly basic molten pool; that the carbon level is high and consequently that the oxidation level is low; and that the molten bath temperature is low. The substantial iron oxide content of the slag-conditioner establishes the optimum environment for phosphorus removal in this first stage "the silicon blow." This optimum environment for phosphorus removal is known to be characterized by low temperature, high basicity and sufficient iron oxide availability. The second stage of the heat is called the "carbon blow." As carbon is oxidized and removed from the metal bath, the amount of iron oxide being formed increases as the carbon content of the metal decreases. From the drawing, it is obvious that the process of this invention provides higher basicity (lime-silica ratio) at any given carbon and oxidation level when compared to the curve for conventional practice.

Thus, at the start of the carbon blow when iron oxide formation is relatively low, rapid increase in the lime-silica ratio occurs in this invention as the lime is taken into solution very rapidly since dicalcium silicate envelopment of lime-bearing particles has been avoided. In fact, the higher basicity, in relation to a given carbon content and therefore oxidation level, persists throughout the carbon blow stage and into the finishing stage of the heat.

Thus, the slag conditioners described in this invention have established an optimum environment for sulfur removal in the carbon blow stage, and in the finishing stage. This environment is far more basic at any oxidation level because of the rapid lime solution. Sulfur removal proceeds throughout the carbon blow before the high oxidation levels characteristic of the finishing stage are reached. The optimum conditions for sulfur removal are high basicity, low oxidation, high fluidity, and high temperature and these conditions are met through use of these slag conditioners.

The following example illustrates the practice of the invention:

EXAMPLE

A heat was refined in a basic oxygen top blown converter holding 230 tons. One minute after oxygen blowing commenced, 7.5 pounds of slag conditioner, 7.5 pounds of fluorspar, 130 pounds burnt lime, and 64 pounds dolomitic lime per ton were added. Hot metal analysis was 3.00 percent C, 1 percent Si, 0.87 percent Mn, 0.113P, 0.026 percent S. Results: First Turndown Metal Analysis was 0.52 percent C; 0.008 percent P; 0.018 percent S. First Turndown Slag Analysis was 12.03 percent $SiO_2$; 39.6 percent CaO; 8.04 percent MgO; U Ratio 3.29 26.4 percent Fe; 4.5 percent Mn; 0.05 percent S; 0.-4 percent P; 1.1 percent $Al_2O_3$.

Generally, in prior practice 10 lbs. of fluorspar per ton of steel was required. To equal that performance 15 to 20 pounds of slag conditioner (metal oxides) alone is required. When a mixture of slag conditioner and fluorspar is used, only 2.5 lbs. of fluorspar and 7.5 lbs of slag conditioner per ton of steel is necessary. This is due to the dual effectiveness of the combined mixture. Thus, there is a reduction in toxic emissions by 75 percent without increasing the total weight of slag conditioners added. Moreover, a reduction in cost of slag conditioner in excess of 50 percent is realized. For example, a high manganese heat will use less fluorspar and a high sulfur heat will use less slag conditioner.

The advantage of the low melting point of the slag or slag conditioner as well as its high basic (lime-silica) ratio, which is about three but which may vary from one to four before achieving the value of three, is to create an environment that accomplishes the effects described above. In addition, the low melting point of the slag conditioner permits the extension of the reaction zone around the oxygen stream. In conventional practice, the highly siliceous material, which is essentially a pool of molten silica, is first created in the early stage of blowing, and is conducive to the formation of dicalcium silicate. In contrast with that situation, the mixture of fluorspar and slag conditioner of this invention provides a highly basic liquid pool in intimate association with the solid lime particles. This effect enlarges the spatial reaction zone around the oxygen stream and physically and thermally increases the solution rate of a solid basic particle.

Another outstanding advantage of the fluorspar and slag conditioner of this invention is that it reduces the rate of erosion of the refractory walls of the basic oxygen converter which rate is at a maximum when the lime-silica ratio of the slag is approximately 0.7. As described above, the slag or conditioner of this invention enables the maintenance of a lime silica ratio in excess of one in the early stages of the heat due to the proper balancing of burnt lime and dolomitic lime.

In addition to the superior conditions for the removal of phosphorus and sulfur, the mixture of fluorspar and slag conditioner of this invention reduces the need for fluorspar in the process.

In conclusion, the mixture of fluorspar and slag conditioner of this invention provides a highly basic liquid slag in which burnt lime particles are not subjected to high concentrations of silica, which heretofore formed dicalcium silicate envelopes around the lime and thereby delayed solution of the lime. The slag conditioner contains fluidizers such as oxides of iron, magnesium and manganese that rapidly take the burnt lime into solution in accordance with established phase diagram relationships. Moreover, the lime fluxing capacity of the slag conditioner is so great that excessive amounts of this material result in slags that are too fluid and cause "slopping" in the converter. This factor shows that the slag conditioner of this invention has the capability of increasing lime solution rates far beyond the requirements of the basic oxygen converter processes, whether submerged or top blown.

It is generally known that unacceptable obnoxious toxic fumes are discharged into the atmosphere and thus polluting when fluorspar is the sole slag conditioner in the environment. This invention sets out to achieve a reduction of pollution by reducing the use of fluorspar to a minimum and simultaneously utilizing waste slag that spoils the countryside. Accordingly, there is resultant improvement in atmospheric pollution and reduction in the amount of waste slag dumped around human habitation.

Finally, another advantage of this invention is that by maintaining a strongly basic slag there is less erosion of the refractory lining of the walls of the metallurgical vessel.

What is claimed is:

1. A steel refining process for facilitating the solution of solid lime by inhibiting the formation of dicalcium silicate, comprising the steps of
   a. heating and oxidizing a molten iron-base metal,
   b. adding solid burnt lime to the molten iron-base metal, and
   c. adding material of high basicity and of a melting point lower than that of solid burnt lime together with a mixture of fluorspar and oxides of iron, manganese, silicon, magnesium, and calcium, which oxides have melting points of from about 2,000° to 2,800°F, to provide a slag devoid of encapsulated solid bodies of burnt lime.

2. The method of claim 1 in step (a) of which comprises directing a stream of pressurized oxygen containing gas onto the surface of the molten metal.

3. The method of claim 1 in which the mixture consists essentially of, by weight percentage, from about 0.1 to 99.9 percent fluorspar and from about 0.1 to 99.9 percent metal oxides.

4. The method of claim 3 in which the mixture consists essentially of, from about 5 to 95 percent fluorspar, and from about 5–95 percent metal oxides.

5. The method of claim 4 in which the mixture consists essentially of from about 10–90 percent fluorspar and from about 5–95 percent metal oxides.

6. The method of claim 1 in which the mixture consists essentially of for each ton of steel, 2.5 lbs. of fluorspar and 7.5 lbs. of metal oxides.

7. The method of claim 1 in which there is from about 5–50 percent iron oxide, from about 2–20 percent manganese oxide, from about 2–15 percent magnesium oxide, from about 20–50 percent calcium oxide, and from about 8–25 percent silicon oxide.

8. The method of claim 7 in which there is from about 15–30 percent iron oxide, from about 5–12 percent manganese oxide, from about 8–10 percent magnesium oxide, from about 30–48 percent calcium oxide, and from about 10–16 percent silicon oxide.

9. The method of claim 8 in which there is about 25 percent iron oxide, about 10 percent manganese oxide, about 9 percent magnesium oxide, about 42 percent calcium oxide, and about 14 percent silicon oxide.

* * * * *